US007343493B2

(12) United States Patent
Challener et al.

(10) Patent No.: US 7,343,493 B2
(45) Date of Patent: Mar. 11, 2008

(54) ENCRYPTED FILE SYSTEM USING TCPA

(75) Inventors: David Carroll Challener, Raleigh, NC (US); David Robert Safford, Brewster, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 574 days.

(21) Appl. No.: 10/108,600

(22) Filed: Mar. 28, 2002

(65) Prior Publication Data

US 2003/0188179 A1    Oct. 2, 2003

(51) Int. Cl.
*G06F 12/14* (2006.01)
*G06F 12/00* (2006.01)
*G06F 17/30* (2006.01)
*H04L 9/00* (2006.01)

(52) U.S. Cl. ............ 713/193; 713/164; 713/165; 713/190; 380/44; 726/26; 711/163

(58) Field of Classification Search ............ 713/1–2, 713/190–194, 164–167; 380/44; 711/163; 726/26
See application file for complete search history.

(56) References Cited

U.S. PATENT DOCUMENTS

| | | | |
|---|---|---|---|
| 5,319,705 A | | 6/1994 | Halter et al. |
| 5,495,533 A | | 2/1996 | Linehan et al. |
| 5,533,125 A | * | 7/1996 | Bensimon et al. .......... 711/163 |
| 5,721,777 A | | 2/1998 | Blaze |
| 5,937,063 A | | 8/1999 | Davis |
| 6,012,145 A | * | 1/2000 | Mathers et al. ............ 713/202 |
| 6,141,774 A | * | 10/2000 | Mattheis ...................... 714/27 |
| 6,144,744 A | * | 11/2000 | Smith et al. ................. 380/45 |
| 6,249,866 B1 | | 6/2001 | Brundrett et al. |
| 7,082,615 B1 | * | 7/2006 | Ellison et al. ............... 726/26 |
| 2002/0019935 A1 | * | 2/2002 | Andrew et al. ............. 713/165 |

OTHER PUBLICATIONS

Trusted Computing Platform Alliance (FCPA), Main Specification Version 1.0, 2000, Campaq, HP, IBM, Intel, Microsoft.*

* cited by examiner

*Primary Examiner*—Ayaz Sheikh
*Assistant Examiner*—Kaveh Abrishamkar
(74) *Attorney, Agent, or Firm*—Carlos Munoz-Bustamante; Dillon & Yudell LLP (57) ABSTRACT

A method for restricting access to an encryption key of an encrypted file system (EFS), whereby access is provided only when a computer system is booted in a trusted state. The EFS encrypts the files within a TPM chip according to TCPA specifications and simultaneously creates the encryption key, which is also stored in the TPM. The key is sealed to one or more platform control register (PCR) states (i.e., the TPM will export the key only when the PCRs are in a pre-defined state.). The original PCR states are modified during boot up of the computer system via a secure hashing algorithm, which extends a value of one PCR to a next PCR at each stage of the boot process and then hashes the value with the remaining content of the next PCR. When the system boot process is completed and before control passes to the user, the values within the PCRs are compared to values stored in a PCR table within the TPM, and the encryption key is exported to the OS kernel only when the PCR values match the table values. The control code of the TPM chip decrypts and exports the key only if the value of each and every PCR matches its corresponding table value. A complete match indicates that the computer system has completed a trusted boot sequence.

20 Claims, 7 Drawing Sheets

ENCRYPTED FILE SYSTEM USING TCPA

BACKGROUND OF THE INVENTION

1. Technical Field

The present invention relates generally to electronic data storage systems and in particular to security of electronic file systems on a data storage medium. Still more particularly, the present invention relates to a method and system for enabling secure storage of and access to an encryption key for an electronic file system located on a data storage medium within a trusted computer platform.

2. Description of the Related Art

The protection of sensitive data is very important to users of computer systems. For example, data such as personnel records or customer credit card numbers may be stored on a computer, and if that computer (or even just the storage media) is stolen, the thief has access to the sensitive information. This is especially troublesome with laptop computers, which are frequently stolen. Moreover, information may be misappropriated even when the storage media is not physically taken, such as when an unauthorized individual gains access to a computer (possibly when that computer is simply online) and copies information from some or all of its files.

To protect information, one type of security procedure involves encrypting the data, so that even if the data falls into the wrong hands, it cannot be read without a key. Encryption of file systems (i.e., utilization of encrypting file systems (EFS) is becoming a common requirement to enable security of components saved on hard disks of computer systems that are accessible by multiple users or are subject to theft, etc. Many application level programs provide some form of such encryption. While better than nothing, however, such existing encryption schemes suffer from a myriad of problems. Most notable among the problems is that the encrypted data is still susceptible to a number of attacks.

Although encryption of EFS protects the files from unsophisticated hackers/attacks, more experienced/sophisticated attackers have found ways to crack into encrypted file systems. During encryption an encryption key is generated and saved within a register on the disk. This encryption key is required to later gain access to the EFS. Possible attacks to the EFS include opening up the hard disk and looking at the files bit by bit to find the key. Thus, keys that are hidden on the hard disk or merely hashed for comparison are not likely to work. Even with advanced EFS and encryption measures, a sophisticated attacker is still able to gain access to the EFS on the hard disk by scanning the hard disk for the key. One approach to providing added protection to EFSs involves the creation of the trusted computer platform, which is typically operated with Linux operating system.

The standards governing the trusted computer platform are promulgated by the Trusted Computer Platform Alliance (TCPA). Specifications for TCPA may be found at the URL (universal resource locator) address on the world-wide web (www) page "trustedpc.org," relevant contents of which are hereby incorporated by reference. TCPA provides a trusted platform module (TPM) chip, which enables data to be encrypted along with password/encryption key, both of which are stored within the TPM chip. The TPM chip is able to read/decipher the encryption key and the blob internally. Entry of the correct authorization/password will cause the TPM to decrypt the encryption key and/or blob and export the key and/or the file.

Figure 5A:
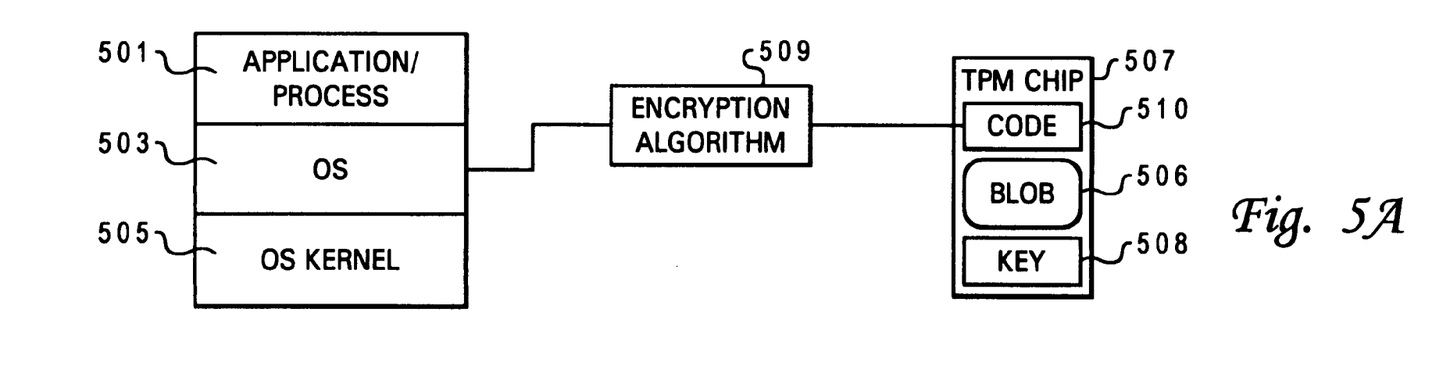
FIGS. 5A-5C are block diagrams illustrating interaction between the TPM chip and other components of a trusted computer platform with which the features of present invention may advantageously be utilized.

FIG. 5A illustrates a simple configuration of a TPM chip 507 and internal data, which includes an encrypted file (i.e., the blob) 506, the encryption key 508, and control code (or logic) 510. Control code 510 responds to the receipt of correct authorization data by decrypting and exporting the encryption key 508, and later exporting the encrypted file 506 from the TPM chip 507. The encryption process is controlled by an encryption algorithm 509, which receives the file and encryption request from the application 501 and operating system (OS) 503. OS 503 operates via the OS kernel 505.

Figure 5B:
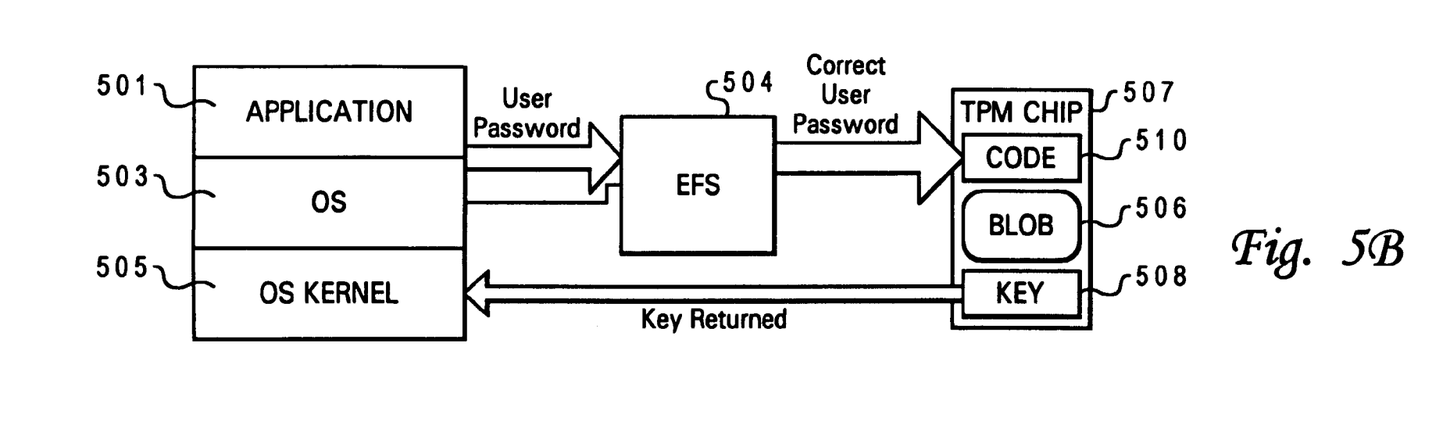
Figure 5C:
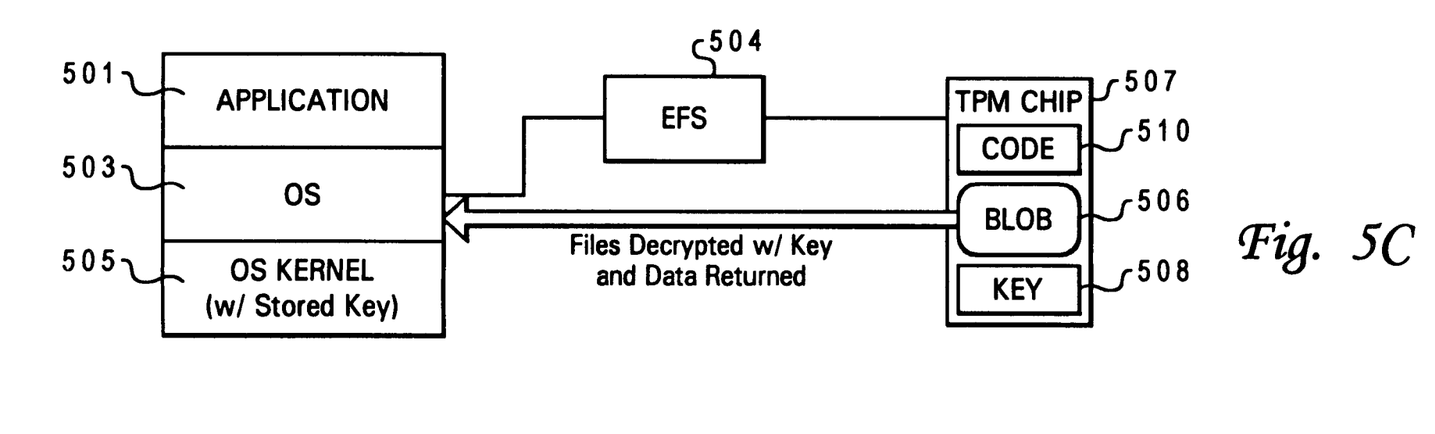

FIG. 5B illustrates the process by which the encryption key is returned to the OS (or OS kernel) when a correct user password is provided to the TPM chip 507. Analysis of the password and other encryption processes are controlled by the EFS 504, which encompasses the encryption algorithm of FIG. 5A. FIG. 5C then depicts the exporting of the files after being decrypted from the blob 506 within the TPM.

One security measure utilized with TCPA is secure hashing. Secure hashing is a one-way, non-linear, encryption method in which 2 or more data values are "hashed" (or combined) to create a new value. Once hashing is completed, the original data values cannot be obtained from the new value because there is no reverse-hashing process available. Thus, for example, a secure hashing algorithm (SHA) takes two 20 byte values and produces a unique 20 byte output. SHA is thus utilized in cryptographic/encryption processes.

With TCPA and EFS, one primary security issue is providing secure storage of the encryption key to prevent the key from being found and utilized by someone for whom access to the file system is not authorized. Often, the user of a multi-user or networked computer system may desire to access the EFS remotely, and he/she may keep the authorization key/password on his person to be able to do so. However, this means that the system must be booted without the password (i.e., in an un-secure fashion) and is not necessarily a trusted/secure system. Any person who acquires the password can then access the file system after the computer system is booted and the person provides the password.

Providing complete security for an EFS utilizing standard encryption techniques has not been possible. With TCPA, the user typically wishes the platform to boot unattended, i.e., without human intervention/input. Having the key made available on the hard drive during the boot sequence is one option. It is not difficult for an operating system (OS) to encrypt data with a secure algorithm and store the data and the encryption key on the hard disk. Currently, however, there is no method to create a file system that encrypts files on a hard disk without exposing the key stored on the hard drive. As indicated above, there is no secure way to store the key on the hard drive because anyone can simply analyze the hard drive to find the key and thereby gain access to the file system.

The present invention thus recognizes that it would be desirable to provide a method and system for securely storing and/or hiding the encryption key required for accessing encrypted file systems on a data processing system. A method and system that utilizes SHA with the platform control registers (PCRs) of a computer system during a boot process to provide secure/trusted access to an encryption key required for accessing an EFS on a trusted computer platform would be a welcomed improvement. These and other benefits are provided by the invention described herein.

SUMMARY OF THE INVENTION

Disclosed is a method for restricting access to an encryption key of an encrypted file system (EFS), whereby access is provided only when a computer system is booted in a trusted state. The EFS encrypts the files within a trusted platform module (TPM) chip according to TCPA specifications and simultaneously creates the encryption key, which is also stored in the TPM. The key is sealed to one or more platform control register (PCR) states (i.e., the TPM will export the key only when the PCRs are in a pre-defined state.). The original PCR states are modified during boot up of the computer system via a secure hashing algorithm, which extends a value of one PCR to a next PCR at each stage of the boot process and then hashes the value with the remaining content of the next PCR.

When the system boot process is completed and before control passes to the user, the values within the PCRs are compared to values stored in a PCR table within the TPM, and the encryption key is exported to the OS kernel only when the PCR values match the table values. The control code of the TMP chip decrypts and exports the key only if the value of each and every PCR matches its corresponding table value. A complete match indicates that the computer system has completed a trusted boot sequence.

Immediately following the comparison, the EFS extends one of the PCRs so that at least one of the PCR values no longer matches its corresponding table value. The selected PCR that is extended by the EFS following the comparison is a PCR that is not being utilized by other software. The extension of the PCR closes a time window in which the encryption key may be exported so that the key may only be exported at the moment the comparison is undertaken and returns with a positive result.

Return of the encryption key alerts the system that the boot was a trusted boot and that the system may thus operate as a trusted computer platform. Following its decryption, the encryption key is stored in memory and may then be utilized to decrypt secondary keys that are utilized by other files of the file system to open the other files as requested by a user. This later user access to the file system is then controlled by the EFS which provides access to specific data within the EFS depending on the specific user authorization. Accordingly, a user may access the trusted computer platform remotely without worrying about compromising the security of the EFS because of an un-secure boot process.

In one embodiment, the encryption key is sealed with authorization data and the background algorithm generates a prompt for an entry of the authorization data during the boot up sequence. In this embodiment, the decryption and export of the encryption key by the TPM chip occurs only when both (1) the input received in response to the prompt matches the authorization data and (2) the PCR values matches those within the PCR table.

All objects, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention may be executed in a variety of computers under a number of different bootstrap programs and operating systems. The computer may be, for example, a personal computer, a midrange computer, a network computer, or a mainframe computer. In addition, the computer may be a stand-alone system or part of a network such as a local-area network (LAN) or a wide-area network (WAN).

Figure 1:
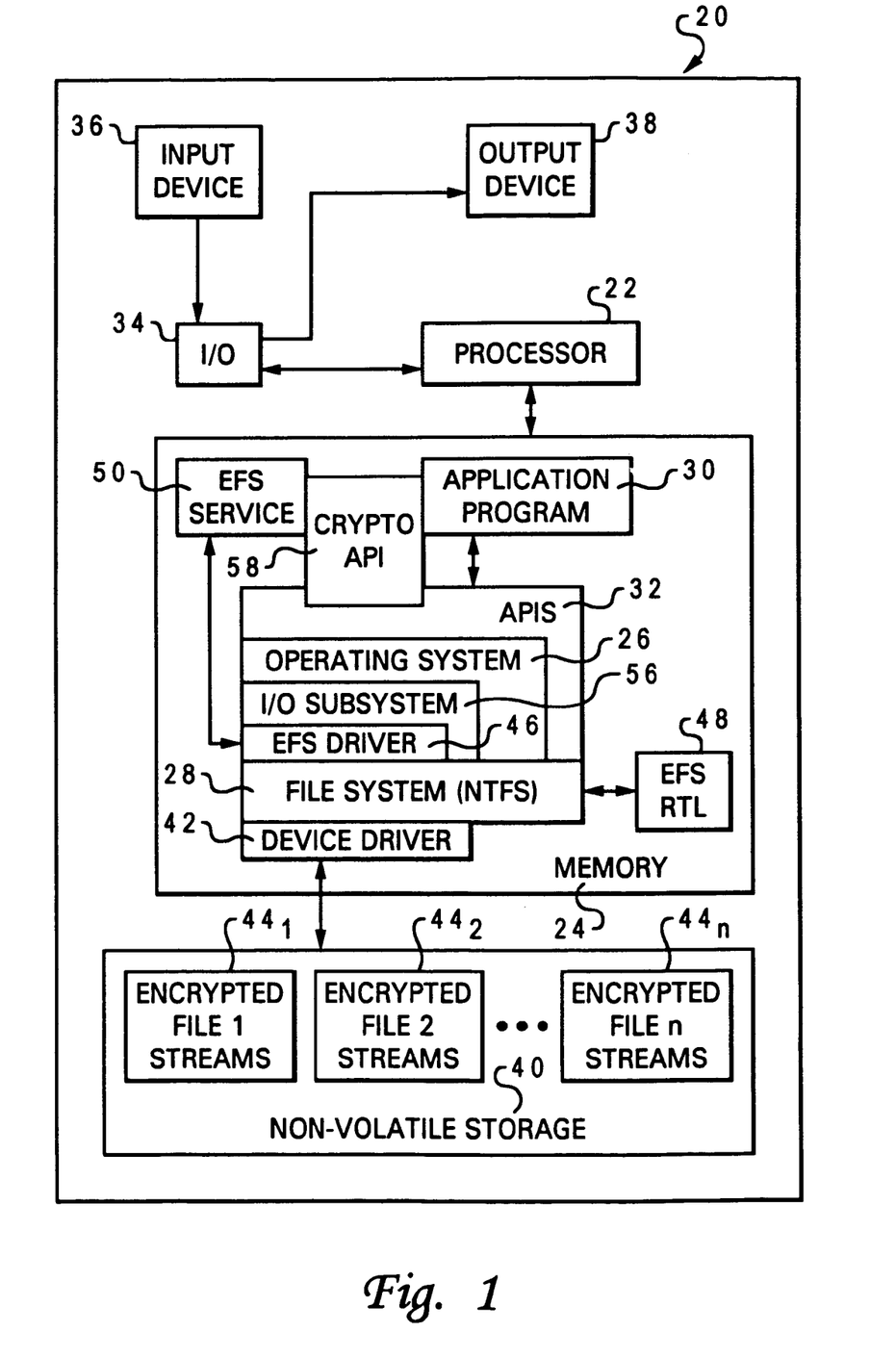
FIG. 1 is a block diagram of component parts of a computer system within which the features of the present invention may be advantageously implemented.

Referring now to the drawings and in particular to FIG. 1, there is shown a computer system 20 within which the present invention may be implemented. The illustrated computer system 20 may be a server, a workstation, or a combination thereof, and may be connected in a known manner to one or more other computer-based resources. Of course, as will become apparent, the invention is not limited to any particular type of computer or network architecture, and may be incorporated into a stand-alone personal computer or the like. In the illustrated embodiments, the computer system 20 is assumed to be a trusted computer platform (TCP) that is operated utilizing the specifications of the Trusted Computer Platform Association (TCPA), relevant contents of which have been previously incorporated by reference. Thus, computer system 20 is equipped with a trusted platform module (TPM) chip and an EFS with which the security encryption processes of the invention are implemented as described in detail below. The TCP enables an entity/user to seal data to a particular software environment in that platform. TCP also provides a means to encrypt cryptographic keys and to state the software environment that must be in place before the keys can be decrypted.

As shown in FIG. 1, the computer system 20 includes a processor 22 connected to a memory 24 having an operating system 26 loaded therein. The computer 20 has a file system 28, such as the Windows NT File system, associated with or included within the operating system 26. However, as can be appreciated, the present invention is not limited to any particular operating system and/or file system, and specific components are presented solely for clarity in describing the invention. At least one application program 30 in memory 24 interfaces with the operating system 26 and the file system 28 through application programming interfaces (APIs) 32.

Computer system 20 also includes input-output (I/O) circuitry 34 for connecting the computer system 20 to one or more networked devices, to one or more input devices 36 such as a keyboard and/or mouse, and/or to one or more output devices 38 such as a monitor and/or speakers. Computer system 20 further includes non-volatile storage device 40 such as a hard disk drive. As can be appreciated, the non-volatile storage device 40 may also operate in conjunction with the random access memory of the memory 24 to provide a large amount of virtual memory via swapping techniques.

The file system 28 connects through a device driver 42 to communicate with the non-volatile storage device 40 and to manage the files thereon. File system 28 generally contains methods for (1) storing, referencing, sharing and securing files, (2) accessing file data, and (3) maintaining file integrity. Notwithstanding, there is not always a clear distinction between a file system 28 and its associated operating system, particularly with those file systems 28 contained within an operating system. Accordingly, it is understood that any or all of the processes or steps attributed herein to the file system 28 may alternatively be performed by the operating system 26, and vice-versa.

The non-volatile storage 40 stores a number of files 44(1)-44(n), which, as illustrated, have their data organized in attribute data streams. As shown in FIG. 1 and as described below, in accordance with the present invention, the files 44(1)-44(n) are assumed to be stored as encrypted data (seen as a blob) on a TPM chip (not shown).

Figure 2:
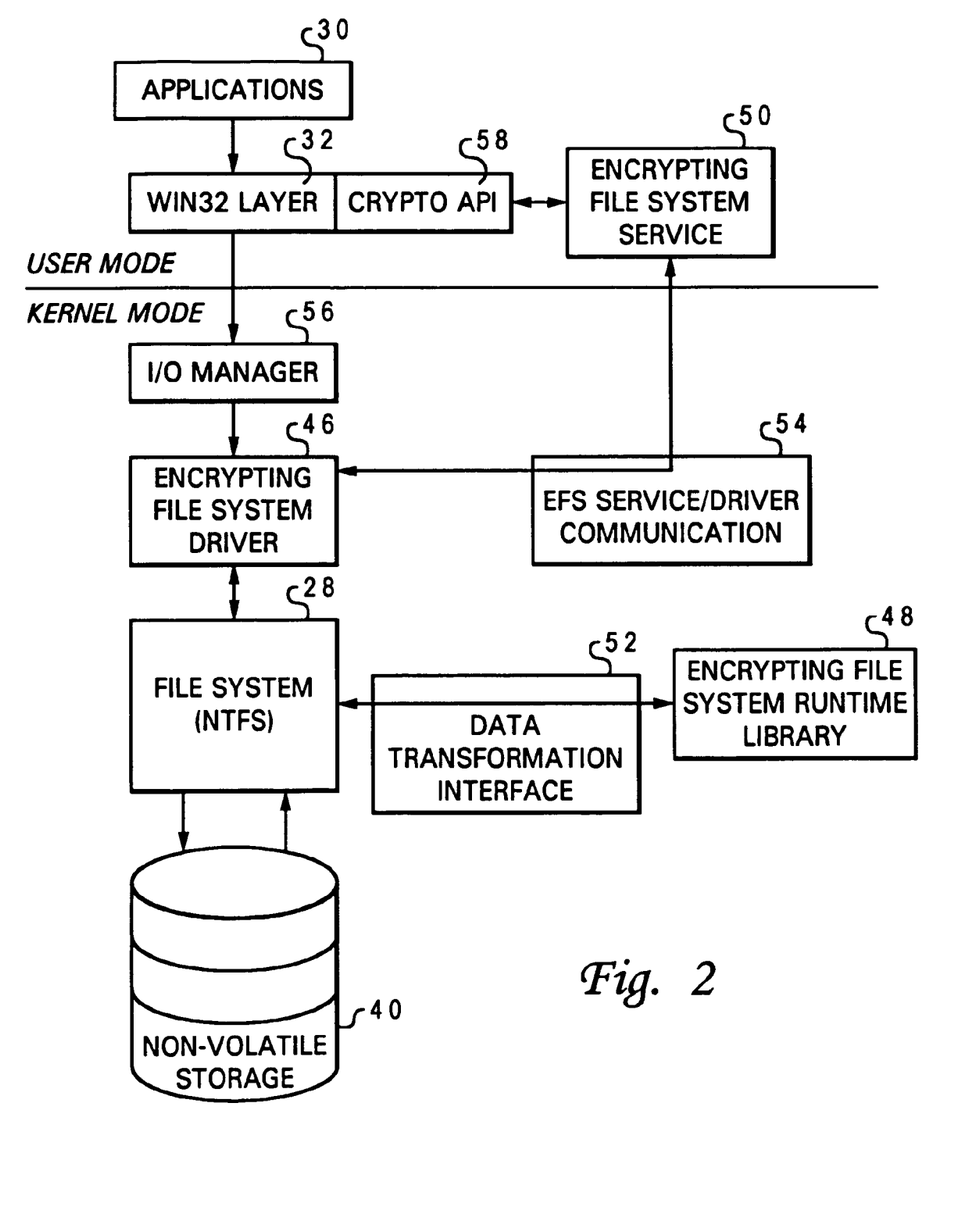
FIG. 2 is a block diagram of the general architecture of encryption and related components of the present invention.

Referring now to FIG. 2, there is illustrated an encrypting file system (EFS). EFS comprises an EFS driver 46, which provides the support to communicate with the user mode EFS service 50 running as part of the security subsystem. EFS further comprises an EFS runtime library (FSRTL) 48 and an EFS service 50. The EFS driver 46 is layered on top of file system 28, and communicates with the EFS service 50 to request file encryption keys, decryption fields (described below) and other key management services. Via file system 28, the EFS driver 46 passes this information to the FSRTL 48 to perform various file system operations, such as open, read, write and append, as described below. Once a file is encrypted or stored in an encrypted directory, the encryption and decryption processes operate transparently to the user.

The EFS driver 46 is loaded dynamically by file system 28 when file system 28 is initialized. File system 28 causes the EFS driver 46 to attach to file system 28 (i.e., be inserted into the layered driver chain) for a particular volume when file system 28 first receives an I/O request packet to create/open a file on that volume, or when file system 28 receives an I/O request packet with a file control operation attempting an encryption related operation on a file on that volume.

Those skilled in the art are familiar with the various processes by which initial encryption of the file system may be implemented and an encrypted key generated and utilized for later access to the encrypted file. Other configuration of EFS may be possible according to TCPA.

The present invention provides a method and system by which the encryption key is hidden within the TPM chip from unauthorized users and made available for accessing the file system only on a trusted computer platform (i.e., only following a secure/trusted boot process of the TCP).

The invention implements the secure hashing algorithm (SHA) within the boot sequence and provides a process in which extended values of PCRs are utilized by the TPM to determine a time window during which decryption and exporting of the encryption key may be completed.

The illustrated embodiment is described within a TCP running the Linux operating system and corresponding boot sequence. However, the features of the invention may be extended/applicable to other boot sequences and to other computer platforms running either Linux or a different operating system. The invention extends the functionality of a boot sequence of the computer system and that of a TPM chip to provide further security of file systems created on the TCP.

For a computer to start running, for instance upon power up or reboot, an initialization program (or bootstrap program) is required. The bootstrap program initializes all aspects of the data processing system, from CPU registers to device controllers to memory contents. The bootstrap program also loads the operating system (OS) and initiates execution of the OS by the processor.

Figure 3A:
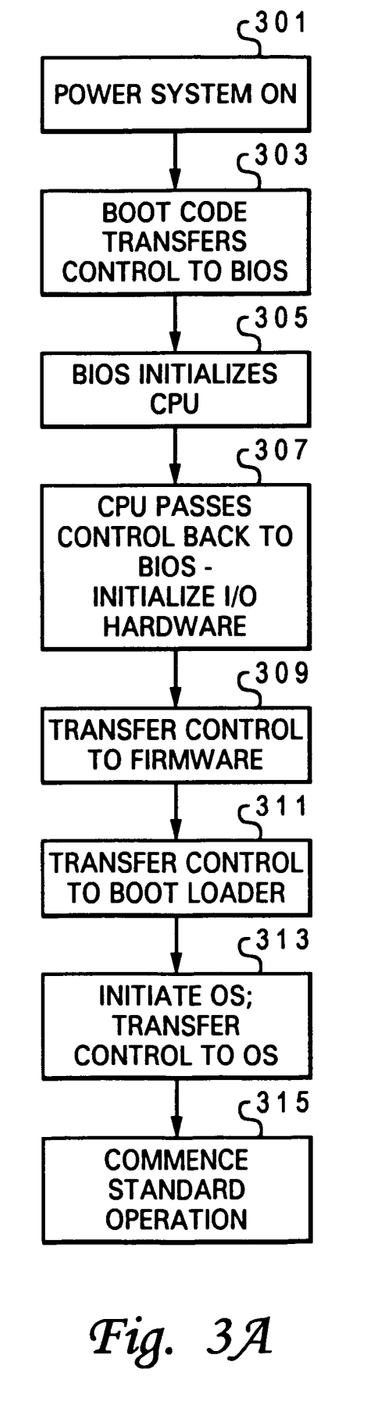
FIG. 3A is a block diagram illustrating the general boot sequence according to one embodiment of the invention.

FIG. 3A illustrates the main steps of a standard operation of a bootstrap program according to the present invention. The boot process begins when a power up of the computer system is completed as illustrated at block 301. As soon as power is received to the system, the CPU boots up by fetching instruction code residing in the boot up firmware (e.g., Erasable Programmable Read Only Memory (EPROM) or flash memory). The boot block of the basic input/output system (BIOS) initiates and takes over control as depicted at block 303. The BIOS initializes the central processing unit (CPU) as illustrated at block 305. The CPU then passes control back to the BIOS, which initiates the input and output (I/O) hardware as depicted at block 307. Control is then passed to the firmware as shown at block 309, and then to the boot loader as depicted at block 311. Finally, the control is passed to the kernel of the OS as indicated at block 313. Utilizing the operating system (OS) kernel as a locating device, the bootstrap program loads the OS, preferably into RAM, and initializes operation thereby. Following, the computer system begins normal operation and the user may interact with the computer system.

The invention entails the creation of a time window during the boot sequence in which encryption key of the EFS may be obtained from the TPM chip. According to one embodiment, the window is created by first "sealing" the key to certain specific Platform Control Registers (PCR) states. That is, the value recorded in the PCRs and which each represent one stage of the boot sequence has to be in a specific state in order for a TPM (security chip) to be willing to decrypt the encrypted block that contains the encryption key and export the key.

The invention thus utilizes the PCR values in the TCPA boot sequence as a password (or sequence of passwords). The encryption key is only available during the boot process and for a limited period of time. The invention therefore provides a one way key decryption and export function. During a trusted boot sequence, the time window is opened when the correct values are in the PCRs. Providing the correct PCR values opens the time window in which the key may be decrypted and exported by the TPM and stored in memory for later utilization by the EFS. Then, the time window is closed, thus securing the key until a next Linux boot sequence on the TCP.

In one embodiment, the window is closed by the EFS algorithm, which extends the value of one of the PCRs that decryption depends upon. According to the illustrative embodiment, the selected PCR that closes the time window is one that is not used by other software executing on the computer, although any PCR maybe extended to yield similar results.

During the boot, Linux, via the modified boot code and SHA extends the PCR value to decode the encrypted key. Since the TPM chip will not decrypt the key if all of the PCR values are not correct, the encryption key boots only into the correct (i.e., trusted) OS kernel. The PCR values required to decode the key is recorded into a PCR table, accessible only by the TPM chip (code). The key itself can only be decrypted following a trusted Linux boot sequence on a TCP.

According to the illustrative embodiment of the invention, the bootstrap program is modified to include a background trusted boot algorithm. The background algorithm comprises a secure hashing algorithm (SHA), code for extending the results of the SHA to another PCR, and code for forwarding the PCR values to the TPM for comparison. The background algorithm also includes code for extending the result of a SHA operation to a next PCR and coded for monitoring the time window and closing the time window before a user obtains access to the system. The SHA produces a series of hashed values, which are extended into the next PCR. During the boot process, the background code interactively hashes and extends the PCR values at each stage of the boot process to provide a sequence of PCR states that are ascertainable.

Figure 3B:
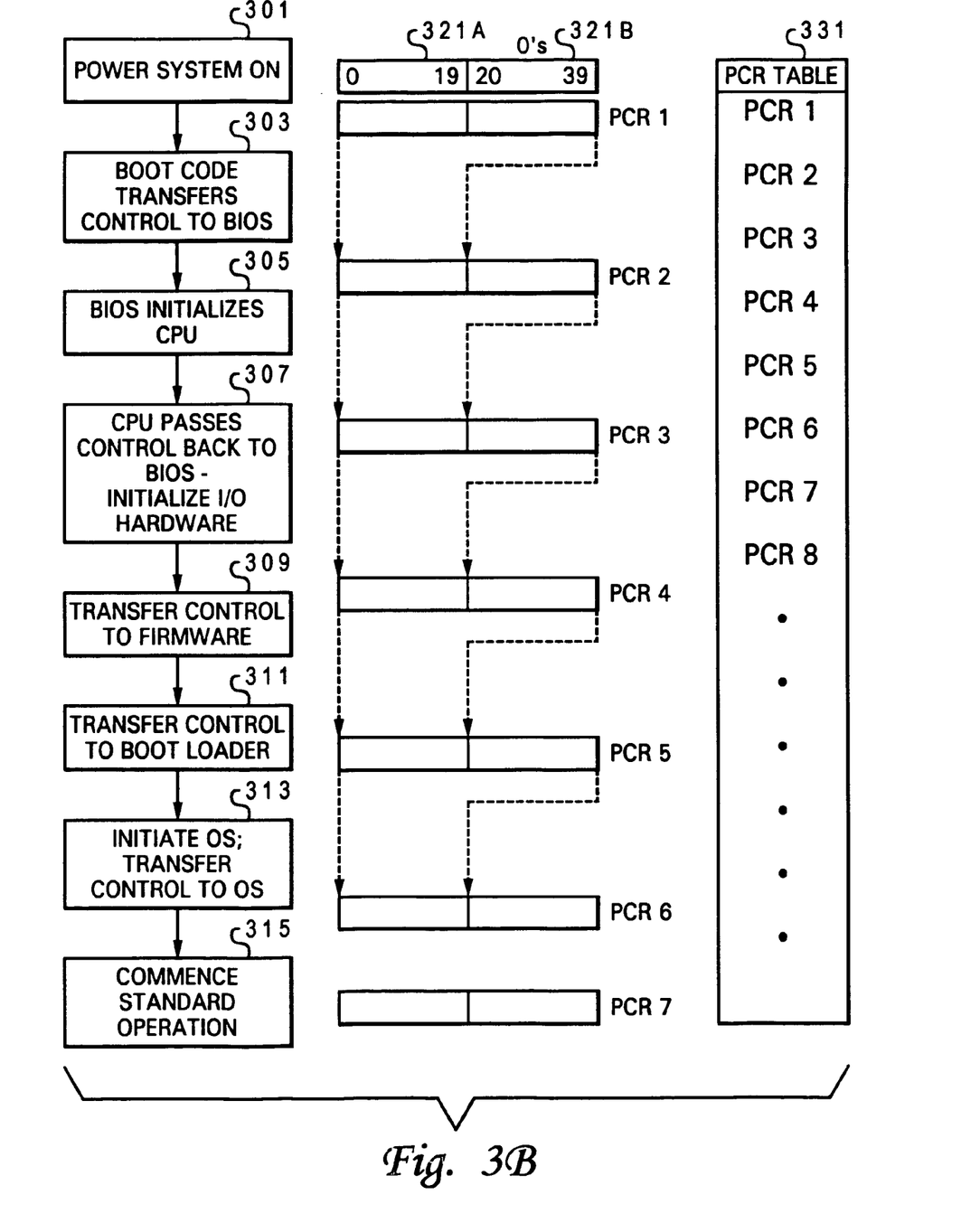
FIG. 3B is a block diagram illustrating the general boot sequence with the secure hashing and extending of PCRs according to one embodiment of the invention.

FIG. 3B illustrates the expanded boot process, which includes hashing of PCR values, extending PCR states, and the resulting processing with the PCRs. A series of PCRs (PCR1-PCR7) are illustrated each having a 40 byte capacity, divided into the first 20 bytes 321A and the second 20 bytes 321B. Initially, each PCR contains a value of 0 in all of its 40 bytes. At power on, the background algorithm is provided with a seed value for extending to the first PCR. The seed value when hashed with the rest of PCR1 yields the first SHA hash to be extended. Notably, each SHA hash is 20 bytes and thus, at each stage of the boot process 20 bytes of data is extended. The extended 20 bytes are concatenated with the 20 bytes of 0s already within the PCR to provide 40 bytes. The concatenated value is then hashed via the secure hash algorithm. The hash of the 40 bytes yields a 20 byte output and this output is extended into the next PCR during the next stage of the boot process.

Upon initially supplying power to the CPU though a power-up sequence, the boot code passes control to the various process block as described above with reference to FIG. 3A. The first 20 byte value is provided by the BIOS and placed within the first 20 bytes 321A of PCR1. The SHA then hashes PCR1 and generates a 20 byte result, which is extended to the first 20 bytes 321A of PCR2. This process of hashing a value of a PCR then extending the result of the hash operation to the next PCR is repeated for each stage of the boot process. Thus, as illustrated, each time the control passes to a next component, the SHA hashed result of the previously extended PCR is extended to the next PCR. This process continues until control passes to the OS kernel (block 313).

Thus 20 bytes of each subsequent PCR is replaced with the SHA hash from the previous PCR. The extend and hash operation is thus an iterative operation continuing until the final boot process completes. Because the hash values are non-invertible (i.e., the original 20 byte values cannot be computationally deduced from the resulting hash, only a secure/trusted boot process will yield the correct sequence of PCR values. FIG. 3B also illustrates a sample PCR table 331 that is provided within the TPM chip. PCR table 331 contains the correct values of the PCR states required to open the time window and export the encryption key.

Figure 4A:
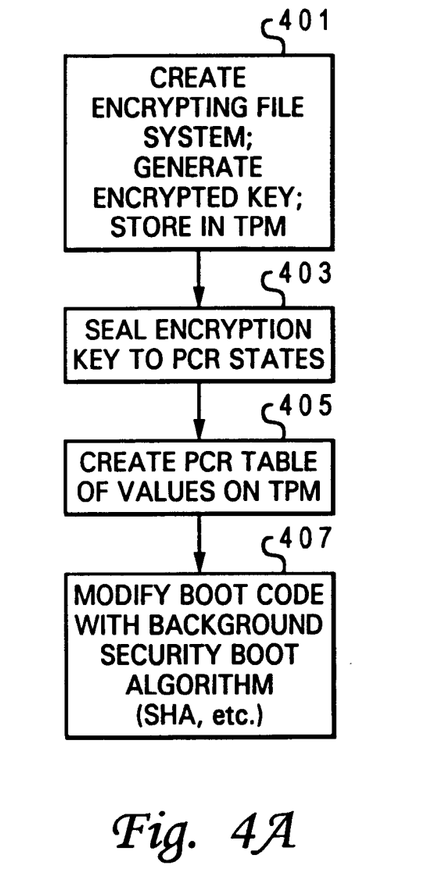
FIG. 4A illustrates a high-level flowchart of a process by which an encryption key is created and stored within the trusted platform module (TPM) and other general system modifications are made according to one embodiment of the present invention.
Figure 4B:
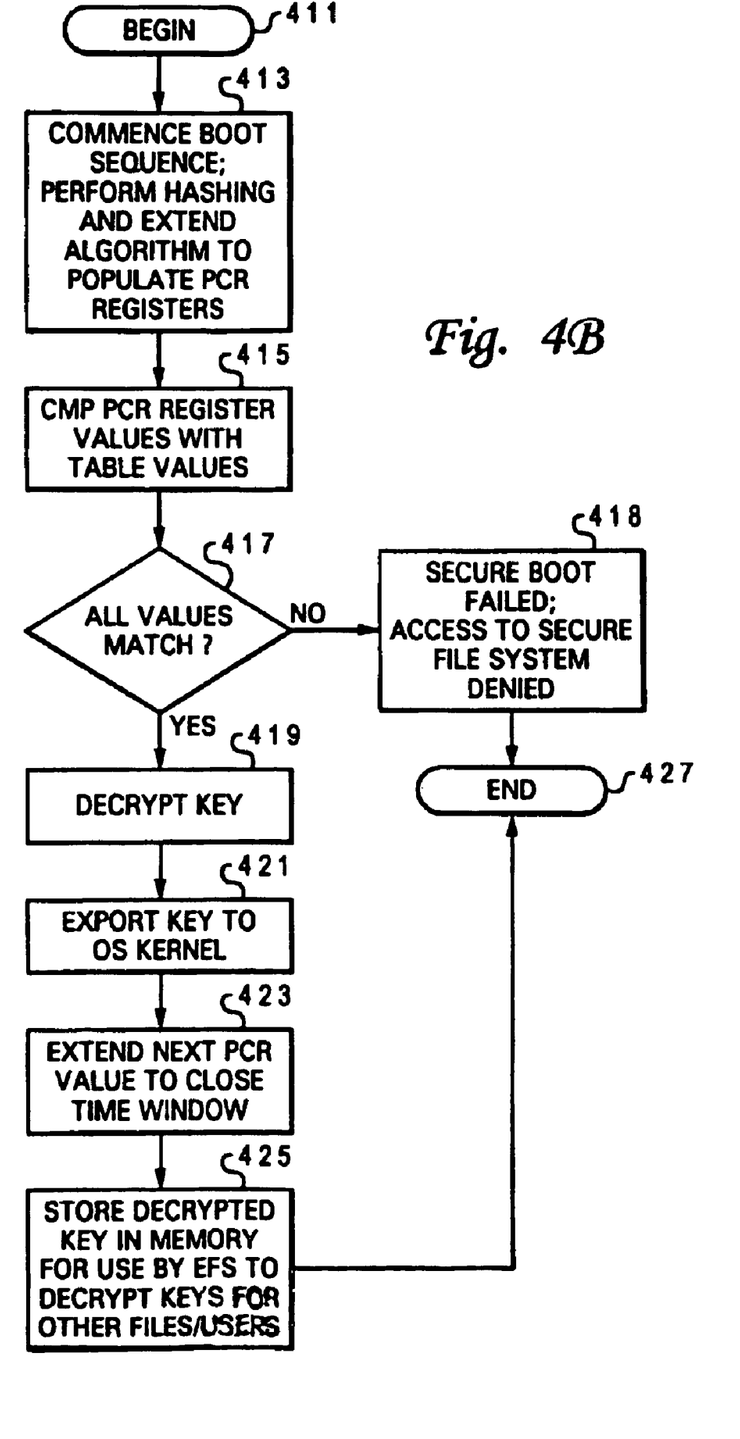
FIG. 4B illustrates a high-level logic flowchart of a process by which an encryption key is decrypted and exported following a trusted boot sequence on a trusted platform according to one embodiment of the present invention.

The PCR values within the table is utilized by the TPM code to determine when a trusted boot has occurred and when to export the encryption key. Thus, the encryption key is sealed to correct PCR states. Access to secure files stored on the TPM is only allowed when the encryption key is available to the OS and kernel. Further, the encryption key is only made available to the OS and kernel when a boot sequence yields the correct values of the PCRs when compared against the table of PCR values. The table values are compared with the PCR values following the boot process as described below with reference to FIGS. 4 and 5D.

Each individual register is checked against its value within the PCR table 331. When each and every value matches, the system completed a trusted boot and the TPM exports the encryption key to the OS kernel. If any of the values does not match, the EFS is alerted that someone has tried to interfere with the boot process and the TPM does not export the encryption key, thus locking the EFS from unauthorized access. Accordingly, the computer system is a trusted system when accessing the encrypted file system because the key will only be provided if the computer boots in a trusted state as determined when the correct values of the PCRs are provided.

Particular PCR values are associated with each PCR register, and the combination of correct PCR states operate as a password to authorize exporting the encryption key. In other words, the encryption key is locked to specific PCR values all being in the correct state. Notably, only 6 PCRs are illustrated as being extended during the boot process. In the illustrative embodiment, all other PCRs, e.g., PCR 7, are assumed to have a 0 value. The blob within the TPM representing the encryption key will be decrypted only if all PCR values (including those not extended) have their expected value.

The time window occurs when all the PCRs are in the correct state. However, the window must be locked before users are able to access the system. To achieve this in the illustrative embodiment, the PCR value is extended from a 0 value via SHA. In one embodiment this is completed by the EFS. The encrypted file system thus requests the encryption key from the TPM when the kernel is loaded and then closes the time window by extending at least one of the PCR values.

Following the decryption and export of the key by the TPM, the OS kernel obtains the key and gives the key to the file system. When the decoded key is provided, the EFS stores that key in memory and uses the key to decrypt the secondary user keys used by all other files. During operation of the computer system, only the OS can obtain the key and the OS tracks which users have authorization for which files of the EFS. The end users are unable to utilize the hard disk (without correct authorization) because he/she is locked out from getting the encryption key required to access the disk. The secondary user keys are decrypted as necessary and appropriate according to the security policy established for each user. The encryption key is therefore not directly accessible to the application, although it may be utilized for file encryption processes. The invention thus guarantees the OS or other programs running on the system are not provided with access to and cannot "grab" the crypto keys and also cannot save data in memory locations to which they do not have authorization.

FIG. 4A is a flow chart illustrating the specific processes involved in setting up the TPM and other features of the invention. The process begins at block 401, which indicates the creation of an encrypting file system with a corresponding encryption key that is stored in a TPM chip. The encryption key is stored in a format that can only be deciphered by (and/or) within the TPM chip. The encryption key is sealed to specific PCR states as shown at block 403, which are reflected within a PCR table created within the TPM as indicated at block 405. At some point, in order to effect the processing required for implementation of the invention, the boot code of the computer system is modified to include a background security algorithm as shown at block 407.

FIG. 4B illustrates the process which occurs after a power on of the computer system and completion of execution of the boot code. The process begins at block 411, and the boot process along with the background security algorithm populate the PCRs with hashed values as shown at block 413. Following the hashing and extending of PCR states at each stage of the boot process, the background security code forwards the PCR values to the TPM as authorization data as indicated at block 415. TPM code compares the received PCR values against the PCR table values and determines at block 417 if all PCR values match. If a match does not occur, the computer system boots without providing the encryption key, and user access to the EFS will be denied as indicated at bock 418.

When a match occurs, the TPM decrypts the encryption key as indicated at block 419 and exports the encrypted key to the OS kernel as shown at block 421. One of the PCR states is then extended to close the time window and prevent further access to the encryption key as shown at block 423. The OS kernel stores the key in memory as indicated at block 425. The key may then be utilized by the OS and the EFS to decrypt the other user key(s) utilized for all other files in the file system and decrypt them as necessary and appropriate. The process then ends as shown at block 427.

Figure 5D:
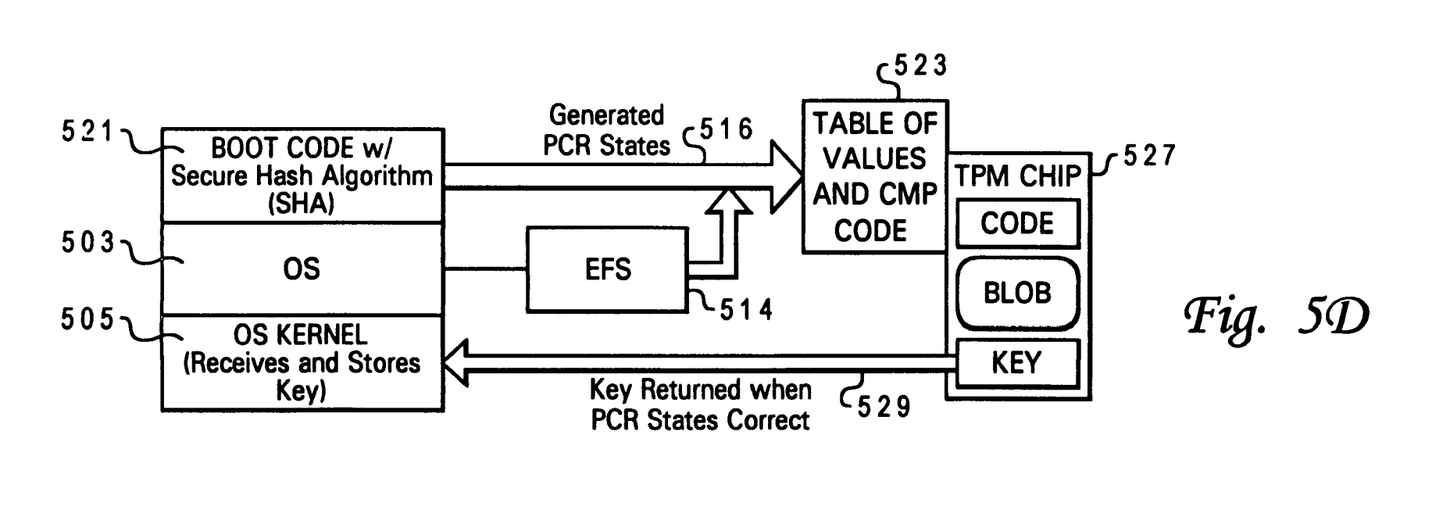
FIG. 5D is a block diagram illustrating the encryption key acquisition process via PCR states generated by the boot code and secure hashing algorithm (SHA) on a trusted computer platform in accordance with one embodiment of the present invention.

FIG. 5D illustrates the processing of the final stage of the boot process by which the encryption key is provided. Key elements includes the boot code with SHA 521 and a PCR table 523 associated with the TPM chip 527. The boot code with SHA 521 generates the PCR states that are sent to the TPM chip 527. The TPM chip 527 includes code that compares the received PCR values against the values within the PCR table 523. If correct authorization data (i.e., the PCRs are in the correct state) is provided to the TPM chip 527, then the encryption key is returned from the TPM chip 527 to the OS kernel 505. This is illustrated by return arrow 529.

FIG. 5D also depicts EFS 514 linked to the stream of PCR values 516. EFS 514 extends one of the PCRs to close the time window during which the key may be exported, as described herein. Although depicted as separated from the OS, the invention is filly applicable to a configuration wherein EFS 514 exists as part of the OS 503.

One embodiment of the invention allows the user to provide added security by sealing the encryption key with authorization data, which is then also required in order to access and/or decode the encryption key. Also, since the TPM uses HMAC to authorize using this data, authorization can be done remotely, but only to a system that is booted into a trusted state. An additional extension of this embodiment allows the EFS to hide the authorization data (rather than the encryption key) needed to utilize a private (encryption) key that is available to decrypt encryption keys for each file.

In keeping with the invention, the Encrypting File System architecture is not limited to any particular encryption algorithm, but rather is fully algorithm agile and may use any cryptography algorithm for the various encryption phases. As a result, the Encrypting File System of the present invention allows for the usage of better and better encryption algorithms as such algorithms advance technologically.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for enabling access to an encryption key of an encryption file system (EFS) within a computer platform, said method comprising:

storing said encryption key on a storage medium that requires correct authorization data before said encryption key can be expected, wherein said encryption is stored in a format that is only decipherable within said storage medium by processing components of said storage medium;

sealing said encryption key to a state of one or more platform control registers (PCRs), wherein said one or more PCRs may be modified by a secure hashing algorithm (SHA) during a boot operation of the computer system; and responsive to a determination following the boot operation that the value of said one or more PCRs matches predetermined values provided as the correct authorization data for said encryption key on said storage medium, first decrypting said encryption key, utilizing code which is stored within said storage medium, that is expected to initiate decryption the encryption key when the encryption key is stored in encryption format but required in unencrypted format to access the EFS; and exporting said encryption key from said storage medium and enabling access to said EFS utilizing said encryption key;

dynamically changing a value of at least one of said one or more PCRs immediately following said determination, wherein said encryption key is exported only at the time said determination is completed and said PCR values match said predetermined values, wherein further said dynamically changing step occurs immediately after said exporting step and prior to access by users to said computer platform; and storing said key is memory following said decrypting and exporting, wherein said key is utilized to decrypt a second key that is utilized by other files of said file system and subsequently open said other files as requested by a user.

2. The method of claim 1, further comprising:
enabling exporting of said encryption key only within a window of time during a boot sequence of said trusted computer platform when said PCR values matches said predetermined values, wherein said encryption key is unavailable at all other times during and after said boot.

3. The method of claim 2, further comprising:
extending a selected PCR in response to a completion of said decryption and export of said key, wherein said window of time corresponds to a time following said determination and said time at which said EFS extends one of said one or more PCRs on which decryption depends.

4. The method of claim 3, wherein said extending step comprises selecting the selected PCR from among said one or more PCRs, where the selected PCR is one that is not being utilized by other processes.

5. The method of claim 4, further comprising extending said selected PCR in response to a passage of a pre-selected period of time.

6. The method of claim 1, further comprising:
initiating a boot sequence on said trusted computer platform; and
extending a value into a PCR and hashing said PCR, wherein a first PCR is hashed and each hashed value of a previous PCR is extended to a subsequent PCR, such that said hashing and extending occurs in an iterative manner until a final boot process is completed.

7. The method of claim 1, wherein said storage medium is a trusted platform module (TPM), said method further comprising:
allowing said TPM to decrypt said key only if the value recorded within said PCRs that represent the values generated during the boot sequence matches said predetermined values stored within a table of said TPM.

8. The method of claim 1, wherein said boot operation comprises several processes including an initialization of an operating system (OS) kernel, wherein said method comprises:
forwarding said values of said one or more PCRs during said OS kernel initialization; and
exporting said encryption key to said OS kernel when said PCR values match the predetermined values; and
storing said encryption key in a memory location associated with said OS kernel at which said OS and said EFS may access said encryption key, wherein said encryption key is un-accessible to other applications and processes executing on said computer platform.

9. The method of claim 1, further comprising:
sealing said key with authorization data;
prompting for an entry of said authorization data during said boot up sequence;
comparing said entry with said authorization data and comparing said value of said one or more PCRs with said predetermined values; and
enabling the decrypting and exporting of said key only when said authorization data matches an input received in response to the prompt and said value of said one of more PCR states matches said predetermined values.

10. The method of claim 1, further comprising enabling remote authorization by a user to the EFS only when said data processing system has booted into a trusted state, wherein said system has booted in a trusted state if said encryption key has been provided to said OS kernel and made available to said EFS following said determination.

11. A data processing system comprising:
a processor and memory;
an electronic file system (EFS) accessible via an encryption key;
a trusted platform module (TPM);
boot code for booting up said data processing system including the operating system (OS) kernel, wherein said boot code comprises an encryption key security access algorithm that enables access to the encryption key of the EFS during a trusted boot process; and
program code for:
storing said encryption key on a storage medium that requires correct authorization data before said encryption key can be exported, wherein said encryption key is stored in a format that is only decipherable within said storage medium by processing components of said storage medium; and
sealing said encryption key to a state of one or more platform control registers (PCRs), wherein said one or more PCRs may be modified by a secure hashing algorithm (SHA) during a boot operation of said computer system;
said encryption key security algorithm of said boot code comprising code that automatically forwards the values of said one or more PCRs to said TPM and code for dynamically changing a value of at least one of said one or more PCRs immediately following said determination, wherein said TPM exports said encryption key when said PCR values match said predetermined values, wherein further said dynamically changing code occurs immediately after said encryption key is exported and prior to access to said data processing system;
responsive to a determination that the value of said one or more PCRs matches predetermined values provided as authorization data for said encryption key on said TPM, said TPM first decrypts said encryption key, utilizing decryption code which is internal to the TPM that is executed to decrypt a stored encrypted version of the encryption key prior to exporting said encryption key, and said TPM exports said encryption key to said OS kernel, whereby the OS subsequently utilizes said encryption key to access said EFS during after-boot operation of said data processing system;
wherein said EFS comprises program code for accessing said encryption key that is stored in memory by the OS kernel following the decrypting and exporting from the TPM, wherein said encryption key is utilized to decrypt a secondary key that is utilized to access files of said EFS and subsequently open said files as requested by an authorized user.

12. The data processing system of claim 11, wherein said encryption key security algorithm controls the exporting of said encryption key from said TPM so that the encryption key may be exported only within a window of time during a boot sequence when said PCR values matches said predetermined values, wherein said encryption key is unavailable at all other times during and after said boot.

13. The data processing system of claim 12, wherein said encryption key security algorithm further comprises code for:
extending a selected PCR in response to a completion of said decryption and export of said key, wherein said window of time corresponds to a time following said determination and said time at which said EFS extends one of said one or more PCRs on which decryption depends.

14. The data processing system of claim 13, wherein said extending code comprises code for selecting the selected PCR from among said one or more PCRs, where the selected PCR is one that is not being utilized by other processes.

15. The data processing system of claim 14, further comprising extending said selected PCR in response to a passage of a pre-selected period of time.

16. The data processing system claim 11, wherein said encryption key security algorithm further comprises code for:
    extending a value into a PCR; and
    hashing said PCR, wherein a first PCR is hashed and each hashed value of a previous PCR is extended to a subsequent PCR such that said hashing and extending steps occur in an iterative manner until a final boot process is completed.

17. The data processing system of claim 11, wherein said encryption key security algorithm comprises code for:
    forwarding said values of said one or more PCRs during initialization of said OS kernel; and
    responsive to a receipt of said encryption key from said TPM, storing said encryption key in a memory location associated with said OS kernel at which said OS and said EFS may access said encryption key, wherein said encryption key is un-accessible to other applications and processes executing on said computer platform.

18. The data processing system of claim 11, wherein:
    said program code for sealing, seals said encryption key with authorization data;
    said encryption key security algorithm further comprises code for prompting for an entry of said authorization data during said boot up sequence; and
    said TPM decrypts and exports said encryption key only when said authorization data matches an input received in response to the prompt and said value of said one or more PCR states matches said predetermined values.

19. The data processing system of claim 18, wherein said TPM compares said entry with said authorization data and compares said value of said one or more PCRs with said predetermined values.

20. The data processing system of claim 11, further comprising means for enabling remote access; and
    said program code includes code for providing authorization by a remote user to the EFS only when said data processing system has booted into a trusted state, wherein said system has booted in a trusted state if said encryption key has been provided to said OS kernel and made available to said EFS following said determination.

* * * * *